United States Patent
Seddon

(10) Patent No.: US 9,271,596 B2
(45) Date of Patent: Mar. 1, 2016

(54) EGG COOKING APPARATUS

(76) Inventor: James Seddon, Middlesex (GB)

(*) Notice: Subject to any disclaimer, the term of this patent is extended or adjusted under 35 U.S.C. 154(b) by 1649 days.

(21) Appl. No.: 11/815,800

(22) PCT Filed: Feb. 15, 2006

(86) PCT No.: PCT/GB2006/000520
§ 371 (c)(1),
(2), (4) Date: Aug. 8, 2007

(87) PCT Pub. No.: WO2006/087537
PCT Pub. Date: Aug. 24, 2006

(65) Prior Publication Data
US 2008/0092753 A1    Apr. 24, 2008

(30) Foreign Application Priority Data
Feb. 15, 2005   (GB) .................................. 0503099.4

(51) Int. Cl.
| A22C 7/00 | (2006.01) |
| H05B 3/06 | (2006.01) |
| H05B 3/34 | (2006.01) |
| H05B 3/02 | (2006.01) |
| A47J 29/02 | (2006.01) |
| A47J 29/04 | (2006.01) |
| A47J 29/06 | (2006.01) |
| A47J 29/00 | (2006.01) |

(52) U.S. Cl.
CPC . *A47J 29/02* (2013.01); *A47J 29/00* (2013.01); *A47J 29/04* (2013.01); *A47J 29/06* (2013.01)

(58) Field of Classification Search
CPC ........... A47J 29/00; A47J 29/02; A47J 29/04; A47J 29/06
USPC ................... 99/333, 403, 440, 426, 380, 382; 211/14; D7/503; 219/535, 524, 528, 219/407, 420, 424
See application file for complete search history.

(56) References Cited

U.S. PATENT DOCUMENTS

| 211,859 | A | * | 2/1879 | Manley | ......................... 249/108 |
| 499,426 | A | * | 6/1893 | Hill | ................................ 99/440 |
| 865,527 | A | * | 9/1907 | Radtke | ........................... 99/440 |
| 1,433,824 | A | * | 10/1922 | Jensen | ............................ 99/440 |
| 1,711,247 | A | * | 4/1929 | Perczian | ......................... 99/440 |
| 1,940,071 | A | * | 12/1933 | Brand | .................... G07F 9/105 186/49 |
| 2,226,844 | A | * | 12/1940 | Carr | .................................. 249/77 |
| 2,279,196 | A | * | 4/1942 | Herman | .................. A47J 27/04 392/403 |

(Continued)

FOREIGN PATENT DOCUMENTS

| GB | 929858 | 5/1963 |
| GB | 1003890 | 9/1965 |

(Continued)

*Primary Examiner* — David Angwin
*Assistant Examiner* — Gyounghyun Bae
(74) *Attorney, Agent, or Firm* — Brooks Kushman P.C.

(57) ABSTRACT

Egg cooking apparatus comprises a cradle (13, 14) for the egg including resistance means (22), and control circuitry for heating the resistance means. The cradle comprises flexible sheet means wrappable round the egg, mounted in a pair of half-shell units (10, 11) mounted for opening and closing around the egg. The half-shell units are of a silicone elastomer with crimped resistance wire incorporated therein, and each backed by a set of resilient fingers. The control circuitry includes temperature sensing means adjacent to the resistance means, and means (15) for setting the desired temperature and cooking time.

15 Claims, 2 Drawing Sheets

(56) References Cited

U.S. PATENT DOCUMENTS

| | | | | |
|---|---|---|---|---|
| 2,425,199 A * | 8/1947 | Navon | | 99/440 |
| 2,459,933 A * | 1/1949 | Gomersall | | A47J 29/02 |
| | | | | 99/331 |
| 2,531,955 A * | 11/1950 | Toney | | 211/14 |
| 2,761,375 A * | 9/1956 | Jepson | | A47J 29/00 |
| | | | | 219/435 |
| 2,807,701 A * | 9/1957 | Conlin | | A47J 29/06 |
| | | | | 126/20 |
| 2,809,268 A * | 10/1957 | Heron | | 219/522 |
| 2,962,067 A * | 11/1960 | Mesojedec | | 99/516 |
| 3,100,711 A * | 8/1963 | Eisler | | 426/107 |
| 3,497,676 A * | 2/1970 | Gravatt | | 219/521 |
| 3,552,303 A * | 1/1971 | Parrish | | 99/447 |
| 3,577,908 A * | 5/1971 | Burg | | 99/333 |
| 3,757,674 A * | 9/1973 | Carroll | | 99/440 |
| 3,791,285 A * | 2/1974 | Mack | | 99/419 |
| 4,106,402 A * | 8/1978 | Gevas | | 99/571 |
| 4,276,820 A * | 7/1981 | Joannou | | 99/334 |
| 4,280,032 A * | 7/1981 | Levinson | | 219/729 |
| 4,281,238 A * | 7/1981 | Noma et al. | | 219/535 |
| 4,476,946 A * | 10/1984 | Smith | | 177/144 |
| 4,501,946 A * | 2/1985 | Nibbe et al. | | 219/729 |
| D285,403 S * | 9/1986 | Wilson | | D7/354 |
| 4,617,860 A * | 10/1986 | Blaylock | | 99/415 |
| 4,656,928 A * | 4/1987 | Mack | | A23L 1/322 |
| | | | | 426/302 |
| 4,798,133 A * | 1/1989 | Johnson | | 99/440 |
| 4,873,922 A * | 10/1989 | Umholtz | | 99/426 |
| 5,293,021 A * | 3/1994 | Davis | | 219/728 |
| 5,678,474 A * | 10/1997 | Hall | | 99/353 |
| 5,934,185 A * | 8/1999 | Sonnier | | 99/440 |
| 6,525,299 B2 * | 2/2003 | Hannon et al. | | 219/436 |
| 6,595,114 B1 * | 7/2003 | Endres et al. | | 99/342 |
| 2004/0099150 A1 * | 5/2004 | Staton | | 99/440 |
| 2004/0139860 A1 * | 7/2004 | Hamm et al. | | 99/275 |

FOREIGN PATENT DOCUMENTS

| | | |
|---|---|---|
| JP | 64002609 | 1/1989 |
| JP | 01230317 | 9/1989 |
| JP | 07100067 | 4/1995 |
| JP | H07100067 | 4/1995 |

* cited by examiner

FIG. 1
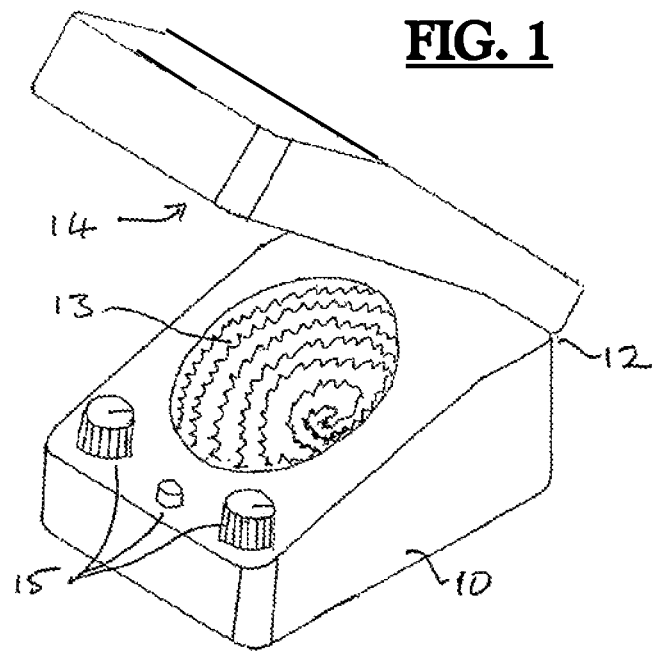
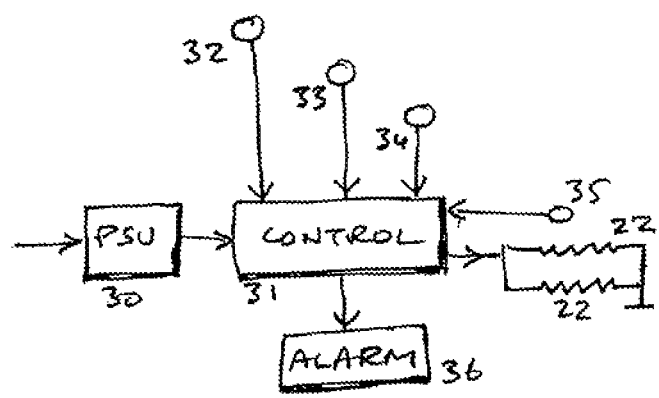
FIG. 3

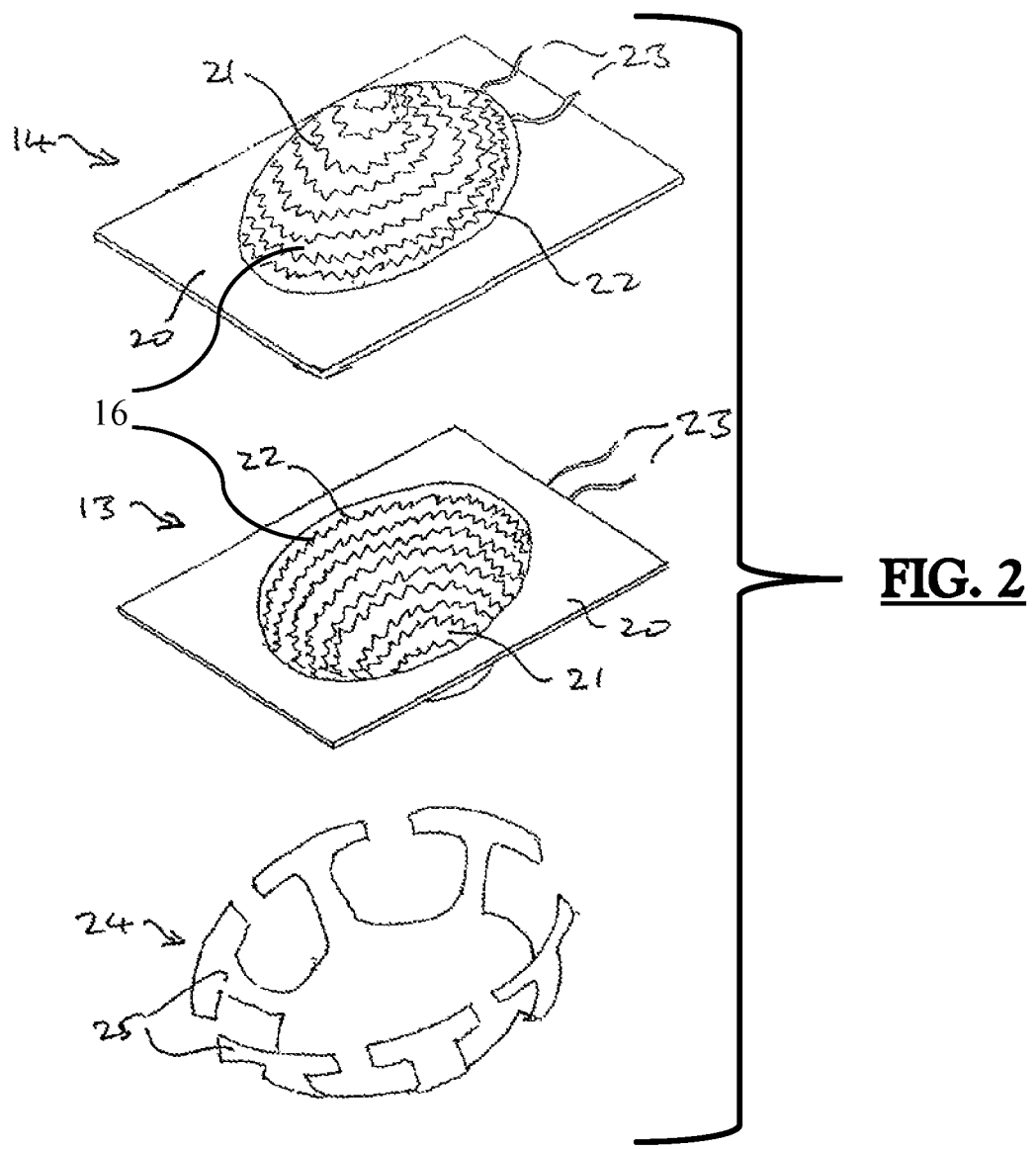

EGG COOKING APPARATUS

BACKGROUND OF THE INVENTION

The present invention relates to egg cooking apparatus and the like.

TECHNICAL FIELD

A boiled egg is a traditional option for breakfast. Boiling eggs is relatively straightforward, but nevertheless can be a somewhat awkward and slightly stressful matter, requiring a saucepan, water, and cooking on a cooker with careful attention to correct timing. Various proposals have therefore been made for automating the boiling of eggs to some degree. The object of the present invention is to provide an improved apparatus for cooking eggs.

SUMMARY OF THE INVENTION

According to the invention there is provided cooking apparatus for food items such as eggs and the like comprising a cradle for the food item including resistance means, and control circuitry for heating the resistance means.

Preferably the cradle comprises flexible sheet means wrappable round the food item, preferably comprising a pair of half-shell units mounted for opening and closing around the item. Preferably the half-shell units are of a silicone elastomer with crimped resistance wire incorporated therein, and each backed by a set of resilient fingers. Preferably the control circuitry includes temperature sensing means adjacent to the resistance means, and means for setting the desired temperature and cooking time.

BRIEF DESCRIPTION OF THE DRAWINGS

An egg cooking apparatus embodying the invention will now be described, by way of example and with reference to the drawings, in which:

FIG. 1 is a perspective view of the apparatus;

FIG. 2 shows the two half-shell heating units and one set of resilient fingers; and FIG. 3 shows the control circuitry.

DETAILED DESCRIPTION

Referring to FIG. 1, the apparatus comprises a base 10 and a lid 11 hinged together at 12. The base 10 includes a half-shell 13; the lid 11 contains a matching half-shell 14. The base also includes control circuitry (described with reference to FIG. 3) and has various control knobs, switches, and indicators 15 thereon.

FIG. 2 shows the half-shells 13 and 14 in more detail. Each half-shell is a sheet of silicone elastomer formed as a flat sheet 20 with a half-egg depression 21 in it (the depression in half-shell 14 is reversed). Each depression has a nickel chromium resistance wire 22 embedded in the elastomer; this wire is generally in the form of a large spiral (which can conveniently be a double spiral, so that both ends are at the outer edge of the depression), and is of crimped or zig-zag form so that the half-shell can deform as an egg is placed in it. The ends of the resistance wires are terminated in contacts 23.

In use, an egg is placed in the depression in half-shell 13, and half-shell 14 is closed on it. The depressions 21 are slightly smaller than the size of a small egg when relaxed, so that closing them over the egg causes them to expand to accommodate the egg. The depressions therefore mold themselves to the egg, ensuring good thermal contact.

To assist in this molding, depression 21 may be backed by a gripping element 24 comprising a set of fingers 25. Element 24 is of flexible and resilient material. A spring (not shown) may be provided behind the centre of element 24 to urge it towards the egg. The half-shell 14 is preferably provided with a similar gripping element (not shown).

FIG. 3 shows the circuitry of the apparatus in block form. The circuitry is fed with mains power via a power supply unit 30 which transforms the mains voltage down to a safe and suitable value or values. The PSU 30 feeds a control unit 31, which drives the resistance wires (heater elements) 22. One or both of the depressions 21 also has a thermistor or other temperature sensor 35 embedded in it, feeding the control unit 31.

The control unit is fed with suitable control signals from control elements 32-34. In a simple version, there may be a single control 33 (in addition to an on-off switch) which sets the time of cooking Preferably however element 34 is used to set the desired cooking temp and element 32 is used to set the size of egg. The signal from the size of egg control is used to adjust the actual cooking time from the nominal value set by element 33, so that a large or small egg is cooked for a slightly longer or shorter time than the time used for a standard egg. If desired, a further control may be provided to set the desired cooking temperature. The controls may be potentiometers, multi-position switches, or of digital form with each being selectable in turn by a suitable menu system.

The control unit controls the current fed to the heater elements to cook the egg in the desired manner. The time of cooking is set by element 33; typical times used for boiling an egg are 3, 4, or 5 minutes. The larger the egg, the longer is takes to cook; element 32 enables the cooking time to be adjusted to compensate automatically for the egg size.

As an alternative, the rate of rise of temperature as cooking starts can be measured. The rate at which heat is generated is fixed while the larger the egg, the larger the surface area over which it is applied. A large egg will therefore heat up less rapidly than a small one. The size of the egg can thus be estimated from the rate of temperature rise, as measured by the sensor 35, and the cooking time is automatically adjusted accordingly.

The sensor 35 also enables the temperature of cooking to be controlled to a desired level. In a simple system, this level will be set to the temperature of boiling water, approximately 100° C., to match the effect of boiling the egg. If the temperature control 34 is provided, however, then the temperature of cooking can be controlled; this enables the consistency of the yolk relative to that of the white to be controlled. The control unit either adjusts the level of the heater current or pulses the current with a variable duty ratio.

When cooking is complete, the control unit turns off the heater current and sends a signal which is here shown as being fed to an alarm unit 36, which can conveniently generate an audible signal and/or turn an indicator light on or off. The apparatus can also be arranged to open automatically or to cause the cooked egg to pop up or out somewhat like a pop-up toaster. For this, it is desirable to provide a wire skeleton holder to hold the egg and enable it to be lowered into and raised out of the cradle 16.

Means for weighing the egg can also be provided, coupled to the control unit so as to adjust the cooking time automatically in dependence on the weight of the egg. This can be done relatively easily if a wire skeleton holder is provided as just discussed, with a strain gauge or other weight sensing unit attached to the skeleton. Alternatively, the size of the egg may be measured.

Means may also be provided for sensing the changing properties of the egg as it cooks, eg by sensing its optical or ultrasound transmitting properties, and controlling the cooking time accordingly.

If desired, the apparatus can be provided with a plurality of cradles so that several eggs can be cooked at once. Preferably the various cradles have independent control circuits so that different eggs can be cooked differently. Micro-switches can be provided so that only occupied cradles are energized.

The control unit preferably turns the heater on only when the lid is closed on the base. Optionally, the on-off switch may be omitted, with the closure of the lid automatically initiating cooking. Preferably, means are provided for detecting the presence of an egg in a cradle, so that only an occupied cradle is energized. (This function can be performed by weighing means if those are provided.)

It is clear that the present apparatus can be used to cook eggs in a manner directly equivalent to boiling, but without the need for a saucepan and water, and without the need for the cook to time the operation. There is no lime scale build-up and nothing to be washed after use. The apparatus is also quicker, as the time delay required to heat and boil water is eliminated, and for the same reason it uses less energy than conventional boiling. Further, since the temperature can be set to various values, different methods of cooking are provided—for example, by using a lower temperature, the egg can effectively be poached.

The invention claimed is:

1. A cooking apparatus for cooking an egg, the apparatus comprising:
a cradle formed of silicone elastomeric material providing a cavity defined by a pair of expandably stretchable depressions having an inside surface adapted to expand and conform to differently sized eggs;
heating elements integrally incorporated with the elastomeric material, wherein each of the heating elements are crimped to form a zig-zag pattern along the length of the heating element so that the zig-zag pattern stretches along the length of the heating element as the depressions stretch and expand; and
a pair of gripping elements disposed on a backside surface of the cradle opposite the depressions and including fingers that wrap around a portion of the cradle corresponding to the depression;
wherein the depressions and integrally incorporated heating elements are configured to stretch and expand to a stretched configuration to conform to the egg as the depressions enclose the egg when the cradle is closed whereby the depressions mold around the egg such that substantially an entire surface of the depressions are in direct physical contact with a shell of the egg and such that thermal contact by conduction occurs on substantially the entire surface area of the shell when the heating elements are ON, wherein the gripping elements are resilient and assist in molding of the depressions around the egg.

2. The cooking apparatus as claimed in claim 1, wherein each heating element comprises a resistance wire.

3. The cooking apparatus as claimed in claim 2, wherein each resistance wire has a crimped configuration along the length of the resistance wire.

4. The cooking apparatus as claimed in claim 3 in which the crimped configuration is crimped to form a zig zag pattern along the length.

5. The cooking apparatus as claimed in claim 3, in which the crimped configuration comprises a stretchable concertina form of each resistance wire along the length.

6. The cooking apparatus as claimed in claim 1, wherein the cradle further comprises a lid and a base and the depressions further comprise at least a pair of depressions, one of the pair of depressions being positioned on the lid and the other of the pair of depressions being positioned on the base; and
a control unit provided for controlling the heating elements, wherein the control unit is configured to turn the heating elements on only when the lid is in a closed position with respect to the base.

7. The cooking apparatus as claimed in claim 1, wherein the heating elements have a configuration of substantially uniformly mutually spaced wire tracks which are incorporated with the depressions and substantially evenly cover the depressions.

8. The cooking apparatus as claimed in claim 7, in which the configuration of substantially uniformly mutually spaced wire tracks comprises a stretchable crimped form of each wire track along the length of each wire track.

9. The cooking apparatus as claimed in claim 1, in which each heating element has a concertina form along a length of each heating element, the concertina form being configured for stretchingly expanding in concertina fashion as an associated said depression with which the heating element is incorporated is stretched over an egg.

10. The cooking apparatus as claimed in claim 9, in which the concertina form comprises a resistance wire configured in a crimped concertina pattern along the length of the resistance wire.

11. The cooking apparatus as claimed in claim 10, in which the resistance wire is incorporated with an associated said stretchable depression in a stretchable crimped configuration.

12. A cooking apparatus for cooking a food item, the apparatus comprising:
a cradle formed of elastomeric material providing a cavity defined by a pair of expandably stretchable depressions having an inside surface adapted to expand and conform to differently sized food items; and
heating elements integrally incorporated with the elastomeric material, wherein each of the heating elements are crimped to form a zig-zag pattern along the length of the heating element so that the zig-zag pattern stretches along the length of the heating element as the depressions stretch and expand,
wherein the depressions and integrally incorporated heating elements are configured to stretch and expand to a stretched configuration so as to conform to the food item as the depressions are closed over the food item whereby the depressions maintain direct physical contact with the food item, the depressions and incorporated heating elements in said stretched configuration being configured to provide heating with thermal contact by conduction directly to the food item, upon turning the heating elements ON, and
wherein the elastomeric depressions and incorporated heating elements are configured to stretchingly expand and be molded to the food item as the cradle is closed whereby thermal contact by conduction all of the way to the food item from the heating elements, which are thereby stretchingly molded around the food item, is ensured, a backside surface of the cradle opposite each of the depressions being backed by a gripping element comprising a set of fingers, the gripping elements assisting in the stretching and molding of the depressions.

13. The cooking apparatus as claimed in claim 12, wherein each heating element further comprises a resistance wire each resistance wire being crimped along the length of the resistance wire so that the resistance wire stretches along the length of the resistance wire as the depressions stretch and expand.

14. The cooking apparatus as claimed in claim 12, wherein the cradle further comprises a lid and a base and the depressions further comprise at least a pair of depressions, one of the pair of depressions being positioned on the lid and the other of the pair of depressions being positioned on the base; and a control unit provided for controlling the heating elements, wherein the control unit is configured to turn the heating elements on only when the lid is in a closed position with respect to the base.

15. A cooking apparatus for cooking a food item, the apparatus comprising:

a cradle formed of elastomeric material providing a cavity defined by a pair of expandably stretchable depressions having an inside surface adapted to expand and conform to differently sized food items; and the cradle including stretchable heating elements integrally incorporated with the elastomeric material, wherein each heating element has a concertina form along a length of each heating element, the concertina form being configured for stretchingly expanding in concertina fashion as an associated said depression with which the heating element is incorporated is stretched over the food item, wherein the depressions and integrally incorporated heating elements are configured to stretch and expand to a stretched configuration so as to conform to the food item as the depressions are closed over the food item whereby the depressions maintain direct physical contact with the food item, the depressions and incorporated heating elements in said stretched configuration being configured to provide heating with thermal contact by conduction directly to the food item, upon turning the heating elements ON, wherein the elastomeric depressions and incorporated heating elements are configured to stretchingly expand and be molded to the food item as the cradle is closed whereby thermal contact by conduction all of the way to the food item from the heating elements, which are thereby stretchingly molded around the food item, is ensured, a backside surface of the cradle opposite each of the depressions being backed by a gripping element comprising a set of fingers, the gripping elements assisting in the stretching and molding of the depressions.

\* \* \* \* \*